United States Patent
Biris et al.

(10) Patent No.: US 10,774,809 B2
(45) Date of Patent: Sep. 15, 2020

(54) CONTROLLING A WIND TURBINE DURING OVER-VOLTAGE RIDE THROUGH

(71) Applicant: VESTAS WIND SYSTEMS A/S, Aarhus N (DK)

(72) Inventors: Ciprian Biris, Hinnerup (DK); Kent Tange, Ry (DK); Duy Duc Doan, Tilst (DK); Torsten Lund, Fredericia (DK); Gert Karmisholt Andersen, Hovedgård (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 62 days.

(21) Appl. No.: 16/144,451

(22) Filed: Sep. 27, 2018

(65) Prior Publication Data
US 2019/0219029 A1 Jul. 18, 2019

(30) Foreign Application Priority Data
Jan. 15, 2018 (DK) .................. 2018 70025

(51) Int. Cl.
*F03D 7/02* (2006.01)
*H02J 3/38* (2006.01)
*H02J 3/18* (2006.01)

(52) U.S. Cl.
CPC .......... *F03D 7/0284* (2013.01); *H02J 3/381* (2013.01); *H02J 3/1842* (2013.01)

(58) Field of Classification Search
CPC ........ F03D 7/0284; F03D 9/255; H02M 1/32; H02M 7/5395; H02M 2001/0025; H02J 3/386; H02J 3/1842
See application file for complete search history.

(56) References Cited

U.S. PATENT DOCUMENTS

| | | | |
|---|---|---|---|
| 2007/0085344 A1* | 4/2007 | Janssen | H02M 5/4585 290/44 |
| 2010/0142237 A1* | 6/2010 | Yuan | H02J 3/386 363/97 |

(Continued)

FOREIGN PATENT DOCUMENTS

| | | | | |
|---|---|---|---|---|
| EP | 2655871 A1 | 10/2013 | | |
| WO | WO-2011160643 A2 * | 12/2011 | | H02J 3/386 |

(Continued)

OTHER PUBLICATIONS

Danish Patent and Trademark Office Search Report for Application No. PA 2018 70025 dated Sep. 17, 2018.

(Continued)

*Primary Examiner* — Christopher E. Everett
(74) *Attorney, Agent, or Firm* — Patterson + Sheridan, LLP (57) ABSTRACT

Controlling a power converters during over voltage condition. A wind turbine signal is monitored for detection of an over voltage of the grid and upon detection of the over voltage, an over-modulation mode is initiated wherein the grid side converter is operated with a modulation index being increased in an over-modulation range at least during a sub-period of the over-modulation mode, and upon the detection of the operational condition, a DC-voltage adjustment mode is initiated wherein the DC voltage of the DC link is decreased from a second voltage level towards a first voltage level at least during a sub-period of the DC-voltage adjustment mode.

20 Claims, 5 Drawing Sheets

(56) References Cited

U.S. PATENT DOCUMENTS

| | | | | |
|---|---|---|---|---|
| 2010/0157632 A1* | 6/2010 | Batten | ............... | H02M 7/4807 363/74 |
| 2010/0207463 A1* | 8/2010 | Fortmann | ............ | H02J 3/1885 307/153 |
| 2013/0154263 A1* | 6/2013 | Attia | ...................... | H02P 9/007 290/44 |
| 2013/0265809 A1* | 10/2013 | Gupta | .................... | H02J 3/386 363/131 |
| 2014/0008912 A1* | 1/2014 | Gupta | .................... | H02J 3/386 290/44 |
| 2017/0257046 A1* | 9/2017 | Schnetzka | ................ | H02P 9/42 |

FOREIGN PATENT DOCUMENTS

| | | | | |
|---|---|---|---|---|
| WO | 2012022353 A2 | 2/2012 | | |
| WO | 2012083963 A1 | 6/2012 | | |
| WO | WO-2015128647 A1 * | 9/2015 | ............. | H02M 1/32 |
| WO | 2015185566 A1 | 12/2015 | | |

OTHER PUBLICATIONS

Extended European Search Report for Application No. 19150387.9-1202 dated Jun. 13, 2019.

David Stojan et al: 11 0ver-modulation phenomena and its influence on the pulse width modulated single-phase inverter output voltage, Automatika. Journal for Control, Measurement, Electronics, Computing and Communications vol. 51, 2010—Issue 2, Jan. 1, 2010 (Jan. 1, 2010), pp. 174-180.

Jan Svensson: "Power Angle Control of Grid-Connected Voltage Source Converter in a Wind Energy Application", Nov. 28, 1995 (Nov. 28, 1995), pp. 1-110, XP055593200, * abstract * * p. 12, paragraph 2—p. 13.

A. Abbas Elserougi et al: 11 Studying the effect of over-modulation on the output voltage of three-phase single-stage grid-connected boost inverter11 , Alexandria Engineering Journal : AEJ, vol . 52, No. 3, Sep. 1, 2013 (Sep. 1, 2013), pp. 347-358.

* cited by examiner

CONTROLLING A WIND TURBINE DURING OVER-VOLTAGE RIDE THROUGH

FIELD OF THE INVENTION

The invention relates to wind turbines, particularly to control of power converters of wind turbines.

BACKGROUND OF THE INVENTION

Use of high DC-link voltages of power converters can reduce the lifetime of the IGBT transistors due to the impact of cosmic rays. Accordingly, it is desired to keep the DC-link voltage as low as possible. However, in certain situations such as situations where the grid voltage increase above nominal grid voltage, the output voltage amplitude of the power generated by the grid side converter may need to be increased, e.g. in order to prevent a high current flowing from the grid into the grid side converter. There are other situations which also require an increase of the voltage amplitude at the grid side power converter.

EP2655871 A1 discloses a method of operating a wind turbine. The wind turbine comprises a power generator, a generator side converter connected to the power generator, a line side converter connected to a power grid through power components, and a DC-link connected between the generator side converter and the line side converter is provided. The method comprises monitoring the grid voltages on the power grid for overvoltage events and if an overvoltage event is detected, the line side converter is operated in an over-modulation range for at least a part of the duration of the overvoltage event.

Thus, EP2655871 A1 provides a solution to the above-mentioned problem by using over-modulation to increase the output voltage in case of overvoltage situations. However, over-modulation causes grid pollution due to generation of harmonics which are injected into the grid.

Accordingly, there is still a need for improving wind turbines in cases where an increase of the generated output voltage is desired.

SUMMARY OF THE INVENTION

Aspects of the invention improve wind turbines with respect to generation of increased output voltages in situations where this is required or advantageous. Other aspects improve the situation where generation of high output voltage causes grid pollution due to use of over-modulation. Other aspects improve the situation where the lifetime of switching elements of the power converter is reduced due to high DC-link voltages.

In a first aspect of the invention there is provided a method for operating a wind turbine which comprises a power generator, a generator side converter, a grid side converter, a DC link electrically connected to an output of the generator side converter and an input of the grid side converter, the method comprises
- monitoring a wind turbine signal for detection of an operational condition which requires an increase of an output voltage of the grid side converter,
- upon detection of the operational condition, initiate an over-modulation mode wherein the grid side converter is operated with a modulation index being increased to a value an over-modulation range at least during a sub-period of the over-modulation mode, and
- upon the detection of the operational condition, initiate a DC-voltage adjustment mode wherein the a DC voltage of the DC link is decreased from a second voltage level towards a first voltage level at least during a sub-period of the DC-voltage adjustment mode.

The first voltage level may have a voltage within a range e.g. from 3 to 10 percent above a minimum DC-voltage, alternatively any suitable value above the minimum DC-voltage. The minimum DC-voltage is a minimum voltage required for generation of an output voltage Uo at nominal level, i.e. an output voltage Uo required for matching a nominal grid voltage Ug. The first voltage level represent a DC-link voltage reserve which relaxes control requirements and provides room for dynamics in the control of the grid side converter, e.g. due to variations in the rotor speed. In general the minimum DC voltage of the DC link 205 should meet both the DC-voltage requirement of the generator- and grid side converters 203, 204, i.e. the minimum DC voltage should correspond to the largest of the voltage requirements of the generator side converter 203 or the grid side converter 204.

The second voltage level represents a high DC-link voltage with provides an output voltage Uo above the nominal level, e.g. a high DC-link voltage which is required for dealing with an operational condition such as a overvoltage situation (OVRT). The second voltage level of the DC link may have been obtained by a previous initial charging period started prior to the sub-period of the DC-voltage adjustment mode where the DC link capacitor is charged up to the second voltage level. This initial charging of the DC link capacitor may be an initial procedure of DC-voltage adjustment mode and/or the over-modulation mode. During this initial charging procedure, the modulation index may controlled to ensure a desired output voltage of the grid side converter.

By increasing the modulation index and decreasing the DC link voltage during the sub-period of the over-modulation mode and the sub-period of the DC-voltage adjustment mode, e.g. simultaneously, the period of time where the DC link voltage is high is reduced. Thus, by this method the impact on the lifetime due to cosmic rays can be reduced. At the same time, the disadvantage of having a high modulation index only arises for long durations of the operational condition, e.g. prolonged over voltage ride through situations. For shorter durations the operational condition, the modulation index may not reach a maximum modulation index value.

The increase of the modulation index to a value in the over-modulation range includes situations where the modulation index is increased from a previous value of the modulation index in the linear modulation range or the over-modulation range.

According to an embodiment, a rate of change of the decrease of the DC voltage and a rate of change of the increase of the modulation index are matched in order to achieve a desired output voltage of the grid side converter at least during the sub-period of the DC-voltage adjustment mode or the sub-period of the over-modulation mode, i.e. at least during a common period of the sub-period of the DC-voltage adjustment mode and the sub-period of the over-modulation mode where the change of DC voltage and modulation mode where the adjustments are matched or controlled to achieve the desired output voltage. The matching, i.e. controlling of the changes of the DC voltage and modulation index, may be performed so that the decrease of the output voltage due to a decrease of the DC-voltage is compensated by the increase of the modulation index, e.g. subject to a constraint that the output voltage is constant or substantially constant. The changes of the modulation index and the DC-voltage may comprise linear or nor-linear adjustments as a function of time.

According to an embodiment, at least a part of the sub-period of decreasing the DC voltage and at least a part of the sub-period of increasing the modulation index takes place concurrently. Advantageously, at least a common period of the adjustments of the modulation index and the DC voltage takes place concurrently so that one adjustment can compensate the other.

According to an embodiment, the sub-period of operating the grid side converter in the over-modulation mode is dependent on a duration of the detected operational condition. Advantageously, the length of the sub-period where the modulation index is increased, depends on the length of the operational conditions. Thus, when a cease of the operational condition is detected, the over-modulation mode and/or the DC-voltage adjustment mode may be stopped.

According to an embodiment, the method comprises obtaining accumulated DC-voltage data based on a level of the increased DC voltage and time data, where the accumulated DC-voltage data relates to an accumulated time where the DC voltage is above a predetermined voltage level. Advantageously, the accumulated DC-voltage data can be used to indicate the remaining lifetime of switching components, e.g. IGBTs, of the power converters.

According to an embodiment, the method comprises determining the second voltage level, the duration of the sub-period of the DC-voltage adjustment mode where the voltage of the DC link is decreased from the second voltage level towards the first voltage level and/or a rate of change of decreasing the voltage of the DC link, based on the accumulated DC-voltage data. For example, a maximum duration of applying the increased DC-voltage, e.g. above a certain threshold, may be limited according to the accumulated DC-voltage data.

According to an embodiment the detected operational condition is an over-voltage situation where grid voltage is above a nominal voltage level. The method may be particularly advantageous for overvoltage situations since the combined application of DC-link voltage and modulation control enables generation of an output voltage required in view of the DC-link overvoltage.

According to an embodiment the sub-period where the modulation index is increased is a second sub-period which succeeds a first sub-period of the over-modulation mode wherein the grid side converter is operated with a modulation index in an over-modulation range for a predetermined or variable period of time, and wherein the sub-period where the DC voltage of the DC link is decreased is a second sub-period which succeeds a first sub-period of the DC-voltage adjustment mode wherein the DC voltage of the DC link is increased from the first voltage level towards the second voltage level. During the first sub-period of the over-modulation mode, the modulation index may be controlled according to a predetermined rate of decrease or dependent on the charging level of the DC-link voltage. The first sub-period of the over-modulation mode may include an initial step increase of the modulation index in order to provide a rapid increase of the output voltage.

According to an embodiment, the first sub-period of the over-modulation mode and first sub-period of the DC-voltage adjustment mode takes place concurrently. In this way the adjustments can matched similarly to the adjustments during the second sub-periods.

According to an embodiment, the method comprises reducing the modulation index during the first sub-period of the over-modulation mode from a value in the over-modulation range to a value in a linear modulation range a dependent on a level of the DC voltage and/or dependent on predetermined rate-of-change.

According to an embodiment, the modulation index is reduced to the value in the linear modulation range in response to the DC voltage reaching the second voltage level. The second voltage level may be high enough to generate the desired output voltage so that a modulation index in the linear range is sufficient. Although it may be preferred to reduce the modulation index to a value in the linear modulation range, it is also possible to only reduce the modulation index to a value in the over-modulation range such as a value in the lower range of the over-modulation range, e.g. close to the linear modulation range.

According to an embodiment, a rate of change of the decrease of the modulation index during the first sub-period of the over-modulation mode and a rate of change of the increase of the DC-voltage during the first sub-period of the DC-voltage adjustment mode are matched in order to achieve a desired output voltage of the grid side converter.

According to an embodiment, the method comprises changing the modulation index dependent on a level of the DC-voltage between the first and second voltage levels. This dependency applies for the first and/or the second sub-periods of the over-modulation mode.

A second aspect of the invention relates to a control system for operating a wind turbine, the wind turbine comprises a power generator, a generator side converter, a grid side converter, a DC link electrically connected to an output of the generator side converter and an input of the grid side converter, the control system is arranged to
  monitoring a wind turbine signal for detection of an operational condition which requires an increase of an output voltage of the grid side converter,
  upon detection of the operational condition, initiate an over-modulation mode wherein the grid side converter is operated with a modulation index being increased in an over-modulation range at least during a sub-period of the over-modulation mode, and
  upon the detection of the operational condition, initiate a DC-voltage adjustment mode wherein the a DC voltage of the DC link is decreased from a second voltage level towards a first voltage level at least during a sub-period of the DC-voltage adjustment mode.

A third aspect of the invention relates to a wind turbine comprising a control system according to the second aspect.

In general, the various aspects and embodiments of the invention may be combined and coupled in any way possible within the scope of the invention. These and other aspects, features and/or advantages of the invention will be apparent from and elucidated with reference to the embodiments described hereinafter.

BRIEF DESCRIPTION OF THE DRAWINGS

Embodiments of the invention will be described, by way of example only, with reference to the drawings, in which.

DESCRIPTION OF EMBODIMENTS

Figure 1:
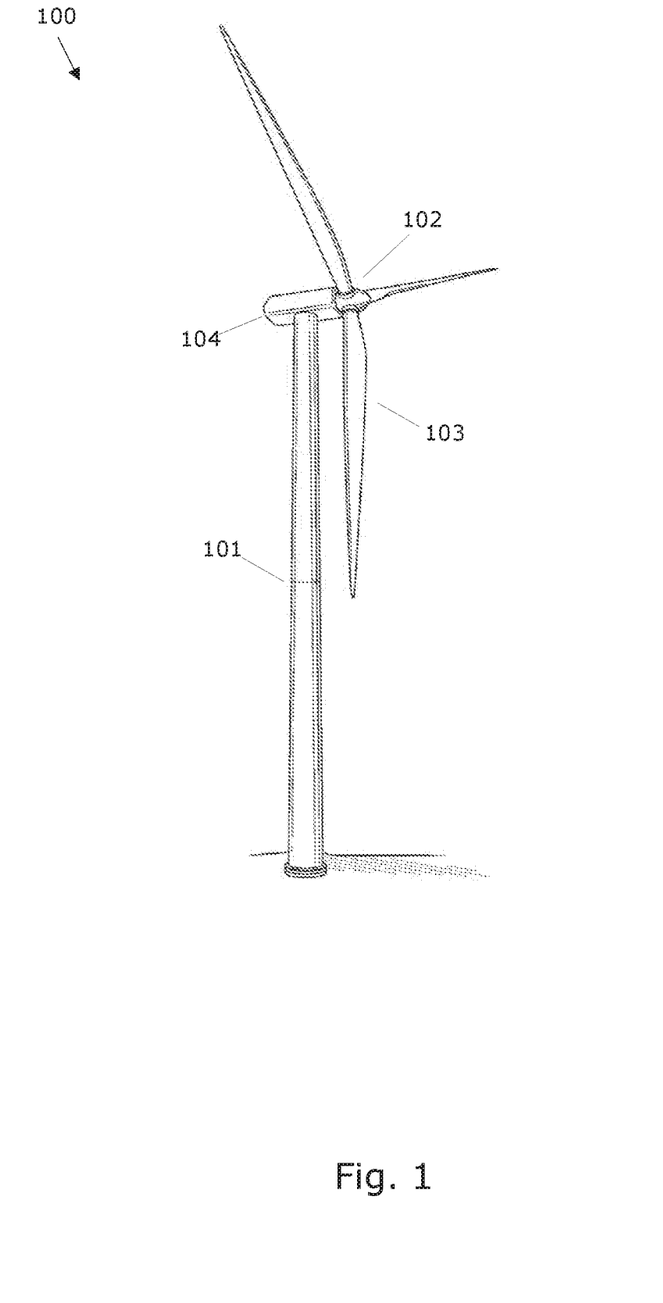
FIG. 1 shows a wind turbine.

FIG. 1 shows a wind turbine 100 (WTG) comprising a tower 101 and a rotor 102 with at least one rotor blade 103, such as three blades. The rotor is connected to a nacelle 104 which is mounted on top of the tower 101 and being adapted to drive a generator situated inside the nacelle via a drive train. The rotor 102 is rotatable by action of the wind. The wind induced rotational energy of the rotor blades 103 is transferred via a shaft to the generator. Thus, the wind turbine 100 is capable of converting kinetic energy of the wind into mechanical energy by means of the rotor blades and, subsequently, into electric power by means of the generator. The generator is connected with a power converter which comprises a generator side converter and a grid side converter. The generator side converter converts the generator AC power into DC power and the grid side converter converts the DC power into an AC power for injection into the utility grid via output inductors of the wind turbine 100.

Figure 2:
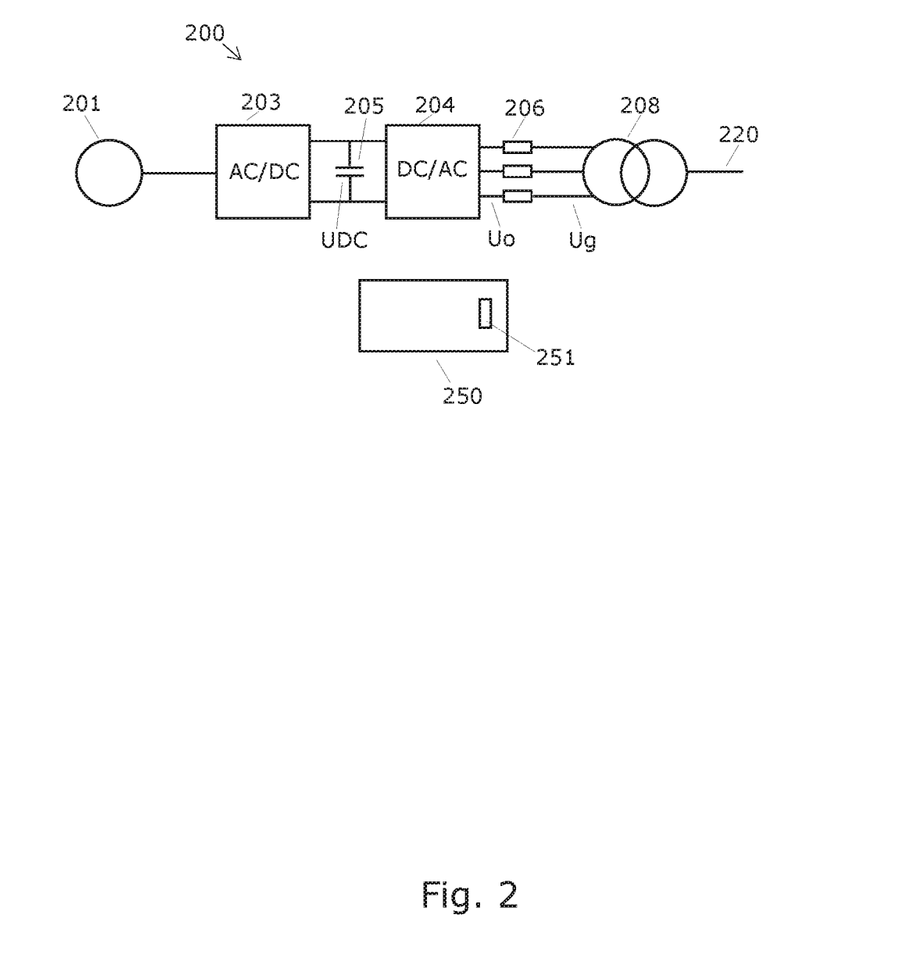
FIG. 2 shows a power generating system of a wind turbine.

FIG. 2 shows an example of a power system 200 of a wind turbine 100.

The power system comprises a generator 201, a generator side converter 203, a grid side converter 204 and a DC-link 205. The DC-link 205 comprises on or more DC-link capacitors which are charged by the DC output current from the generator side converter 203 and which supplies DC power to the grid side converter 204. The output AC current from the grid side converter 204 is supplied via output inductors 206 and possibly via a grid transformer 208 to the grid 220.

The grid side converter is able to withstand a certain grid overvoltage Ug, e.g. 1.1-1.3 pu. To some degree, the grid over-voltages may be handled by absorbing reactive power so that a voltage drop is generated over the output inductors 206. Absorption of reactive power may lead to charging of the DC-link capacitors. Charging of the DC-link capacitor may lead to unintended tripping of the converter system/wind turbine and/or damage of power components.

Alternatively, such overvoltage situations may be handled by increasing the output voltage Uo of the grid side converter 204, i.e. the voltage amplitude at the electrical connection between the output of the grid side converter 204 and the output inductors 206.

Overvoltage situations may be due to a temporarily increase of the grid voltage due to some grid problem which cause an increase of the grid voltage above the nominal grid voltage. Such overvoltage situations may be referred to as overvoltage ride through situations (OVRT). Another situation which may be handled by an increase of an output voltage of the grid side converter is a recovery from an under-voltage situation where the grid voltage increases from a low voltage to the nominal voltage level. The grid voltage recovery situation requires a temporarily increased output voltage Uo due to dynamics of the control system, particularly due to a delay between the increase of the grid voltage Ug during the recovery and a feedforward value of the grid voltage Ug which is added to the controller 503 (see FIG. 5, but feedforward is not shown) and forms part of the output Uq. Similarly, a generator condition which requires or causes an increase of the generator speed may require an increased output voltage of the grid side converter. As another example, in situations where the modulation index of the PWM-modulation is close to the over-modulation range (see explanation below), a conditions may arise where over-modulation is temporarily required in order to increase the output voltage.

FIG. 2 also shows a control system 250 for operating the wind turbine, particularly for controlling the grid side converter 204. The grid side converter 204 uses some variant of pulse width modulation (PWM) for converting the DC power into AC power. The control system 250 is used for controlling the modulation of the grid side converter 204. Particularly, the grid side converter 204 may be controlled in a linear modulation mode and an over modulation mode. Furthermore, the control system 250 is used for controlling the DC-voltage of the DC link 250. An example, of the voltage control is explained in connection with FIG. 5.

The output voltage Uo of the grid side converter is dependent on the DC-voltage UDC and the modulation factor. Thus, the DC-voltage sets a limit on the maximum output voltage Uo. In the linear modulation mode the grid side converter is operated with a modulation index within a linear modulation range. In the linear modulation range the output voltage Uo increases linearly with the modulation factor up to a maximum linear modulation factor. By increasing the modulation factor further beyond the maximum linear modulation factor into an over-modulation range, the output voltage Uo can be increased beyond the maximum voltage amplitude which can be achieved in the linear modulation mode, but at the cost of lower order harmonics in the output voltage Uo. The lower order harmonics leads to grid pollution. Accordingly, use of over-modulation may not be acceptable, e.g. according to grid codes. However, use of over-modulation may be acceptable for shorter periods. The maximum voltage amplitude is achieved when the output voltage signal Uo has the form of a square-wave. In this case the grid side converter 204 is operated in six-step operation or with a maximum over-modulation.

Another way to increase the output voltage amplitude Uo is to increase the DC-voltage UDC of the DC link 205. A problem with increasing the DC link voltage is that the risk for a breakdown of the switching elements, e.g. IGBTs, due to cosmic rays increases with the DC link voltage. The DC link voltage may be increased, but at the cost of reduced life-time of the switching elements.

Figure 3A:
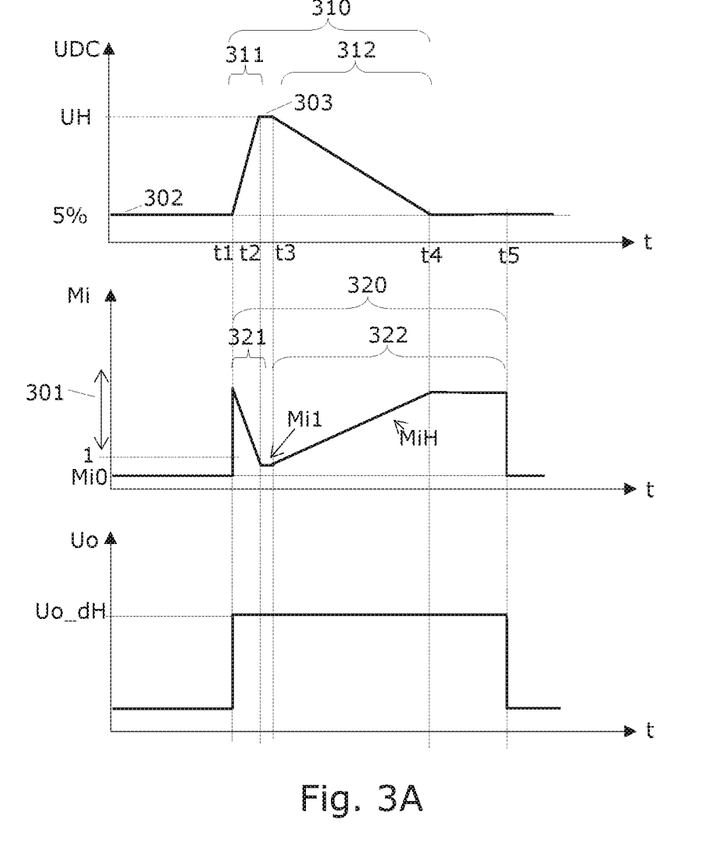
FIG. 3A shows a method for operating the wind turbine in response to a detected operational condition which requires an increase of the grid converter's output voltage.

FIG. 3A illustrates a method for operating the wind turbine 100 in response to a detected operational condition, particularly an overvoltage (OVRT) situation, which requires an increase of an output voltage Uo of the grid side converter 204.

Thus, FIG. 3A illustrates an example where the operational condition detected at t1 requires an increase of the output voltage Uo up to the desired output voltage Uo_dH. The operational condition may be an overvoltage situation of the grid where the grid voltage may increase to e.g. 20% above the nominal grid voltage.

The operational condition—e.g. an overvoltage of the grid—may be detected by a monitoring function 251 of the control system 250. The monitoring function may be configured to measure or estimate the grid voltage Ug or other operational variable or parameter of the wind turbine 100. In general, the monitoring function monitors a wind turbine signal and on basis of the signal, a measured or estimated signal or value is obtained from which the level of the overvoltage or presence of the overvoltage can be determined.

At t1 an overvoltage of the grid is detected. This triggers the start of an over-modulation mode 320 wherein the grid side converter is operated with a modulation index Mi in an over-modulation range 301 for a predetermined or variable period of time—in this example between t1 and t5. In this example, the maximum modulation index Mi in the linear range has the value "one" and over-modulation indices has values above "one". However, the boundary between linear modulation and over-modulation can have other values dependent on how the modulation index is defined. Prior to t1, the modulation index Mi has the value Mi0

Due to the increase of the modulation index Mi, the output voltage Uo increases at t1 to the desired voltage Uo_d.

In this example, the reference voltage of the DC-link during normal operation is set to a value which is 5% above a minimum value Umin. The 5% margin provides a DC-voltage reserve which can be used to adjust the output voltage Uo, e.g. by increases of the modulation index Mi in the linear modulation range. Furthermore, the voltage reserve provides room for dynamics of the control of the grid side converter 204. The voltage level of the voltage reserve is controlled by the control system 250.

In this example, at the same time when the over-modulation mode is initiated, i.e. at time t1, the control system 250 initiates a DC-voltage adjustment mode 310—here between t1 and t4—where the DC-link voltage UDC is controlled. The control of the DC-voltage includes an initial increase of the DC-link voltage from a first voltage level 302 (here 5% above nominal) towards a second voltage level 303, e.g. a high voltage UH during t1-t2. In order to compensate the effect of the increase of the DC-link voltage on the output voltage Uo, the modulation index Mi may be decreased during t1-t2. The modulation index Mi may be decreased to value Mi1 which together with the second voltage level 303 generates the desired output voltage Uo_d. The modulation index Mi1 may be above or preferably below the over-modulation threshold value 1. For example, the modulation index may be returned to the initial value Mi0, i.e. so that Mi0=Mi1. As a result, the output voltage Uo is constant during t1-t2.

The over-modulation mode 320 comprises a first sub-period 321 wherein the grid side converter 204 is operated with a modulation index in an over-modulation range 301 for a predetermined or variable period of time.

The DC-voltage adjustment mode 310 comprises a first sub-period 311 wherein the DC voltage of the DC link 205 is increased from the first voltage level 302 towards the second voltage level 303. The duration of the first sub-period 321 of the over-modulation mode 320 may be a variable period which depends on the charging time from t1 to t2.

Thus, in order to generate the desired output voltage Uo_dH as soon the operational condition is detected at t1, the modulation index Mi is increased to a value in the over-modulation range. At the same time, or possibly delayed, the DC-link voltage is increased. At t2, the DC-link voltage reaches the high DC-link voltage UH which is required for generating the desired output voltage Uo_dH without over-modulation. The high DC-link voltage UH may be approximately 10% higher than the nominal DC link voltage, or 20-30% higher than the nominal DC-link voltage.

At t2, the DC-link capacitor has been charged up to the desired DC-voltage level UH, 303 so that the desired output voltage Uo can be achieved solely on basis of the increase of the DC-link voltage or partly on basis of the increased DC-link voltage when Mi=Mi1 is greater than the initial modulation index Mi0. It is also possible that the DC-link capacitor is charged up to a higher DC-voltage, e.g. a voltage above the level UH, 303, so that Mi1 may be decreased to a value lower than the initial modulation index Mi0. Thus, in general Mi1 may be lower, greater or equal to Mi0.

Use of the high DC-link voltage for long periods may have a significant impact on the remaining lifetime of the grid side converter 204. Accordingly, use of the high DC-link voltage is preferably limited to a minimum. On the other hand, over-modulation is also problematic since it may generate undesired grid pollution.

Mi1 may be a value in the linear modulation range or possibly in the lower end of the over-modulation range 301. Thus, as an alternative to decreasing the modulation index to a value in the linear modulation range, the modulation index Mi may be reduced to a lower value in the over-modulation range, e.g. a value which is acceptable for a given period of time with respect to generation of grid pollution due to generation of low-order harmonics. For example, the value Mi1 of the modulation index may be maintained for a period from t2 to t3 as indicated. Similarly, the increased DC-link voltage UH may be maintained during t2 to t3.

The first sub-period 311 of the DC-voltage adjustment mode 310 and the first sub-period 321 of the over-modulation mode 320 provides a rapid, almost instantaneous, increase of the output voltage Uo. However, due to the negative influence of the high DC voltage UH on the life-time of the switching elements, the duration of the first sub-period 311 should be limited. It is noted that the first sub-period 311 may include the period from t2 to t3 where the DC voltage is maintained at a constant or substantially constant value.

The concurrent application of increasing the modulation index into the over-modulation range, i.e. the step of the increase at t1, and increasing the DC-link voltage during t1 to t2, allows a fast increase of the output voltage Uo so that desired increase of the output voltage Uo can be addressed effectively. According to the example in FIG. 3, the first sub-period 311 of the DC-voltage adjustment mode 310 and the first sub-period 321 of the over-modulation mode 320 takes place concurrently during a common sub-period from t1 to t2. Alternatively, the first sub-periods 311, 321 may have overlapping periods, but may have different start and/or end times. For example, the increase of the DC voltage UDC may be initiated at time t1' (not shown) which is delayed relative to the increase of the modulation index Mi at time t1. The over-modulation mode 320 and the DC-voltage control mode 310 need not be started at the same time, e.g. at t1 as shown in FIG. 3.

FIG. 3A illustrates a solution to the problem on the life-time aspect. Thus, after t2, when the DC-link voltage has reached the second voltage level 303 or other DC-voltage level above the first voltage level 302, the DC-link voltage UDC is decreased and the modulation index Mi is increased to a higher value MiH in the over-modulation range. The modulation index MiH is higher than the modulation index Mi1. The modulation index may be increased up to the six-step modulation or any other value in the over-modulation range 301. The decrease of the DC-link voltage UDC and the increase of the modulation index may be initiated immediately after time t2 or delayed a short time to time t3 as illustrated. The decrease of the DC-link voltage UDC and the increase of the modulation index Mi may start at the same time t2 or t3, or they may start at different times. Thus, the first sub-period 321 of the over-modulation mode 320 may be succeeded by a second sub-period 322 where the modulation index Mi is increased. Similarly, the first sub-period 311 of the DC-voltage adjustment mode 310 may be succeeded by a second sub-period 312 wherein the DC voltage of the DC link is decreased from the second voltage level 303 to the first voltage level 302.

The increase of the modulation index and the decrease of the DC-link voltage may be ended at the same time t4, or possibly at different times. After the DC-voltage has been decreased back to the first voltage level 302, the modulation index Mi is maintained at the high modulation index for a fixed or variable period of time, e.g. until t5 as shown.

The time t5 may be the moment with a cease of the operational condition is detected. Consequently, at t5 the modulation index Mi is reduced back to the value before the over voltage detection at t1.

The change of the modulation index Mi from the over-modulation value to a normal (Mi0) or lower modulation index (Mi1), and/or the increase of the modulation index from the low modulation index (Mi0 or Mi1) may be performed dependent on the DC-link voltage level obtained during the part of the DC-voltage adjustment mode where the DC-voltage is increased or decreased, respectively.

The modulation index Mi could be changed several times dependent on measures of the DC-link voltage, e.g. during the increase of the DC-link voltage to adapt the modulation index Mi to the gradual increase of the DC-link voltage. Thus, the modulation index may be adjusted one or more times during the over-modulation mode dependent on an obtained DC-link voltage between the first and second voltage levels 302, 303.

The desired output voltage Uo varies dependent on the amount of reactive current delivered or received by the grid side converter 204. That is, the voltage drop over the output inductors 206 varies dependent on the reactive current flowing through the inductors 206, so in order to generate a desired grid voltage Ug, the output voltage Uo may need to be varied so that the output voltage Ug at the grid side of the inductors 206 satisfies the grid voltage level.

Accordingly, in addition to changing the modulation index dependent on a level of the DC-link voltage UDC between the first and second voltage levels, the modulation index may be adjusted dependent on variations of the desired output voltage Uo.

Furthermore, the DC-link voltage UDC may be adjusted during the DC-voltage adjustment mode 310 dependent on variations of the desired output voltage Uo, possibly concurrent with adjustments of the modulation index during the over-modulation mode 320. Thus, since the duration of the operational condition may not be known and since the required output voltage Uo may vary during the operational condition, the concurrent rate of change of the decreasing DC-link voltage UDC and the increasing modulation index Mi may be adjusted during the adjustment period from t3 to t4. Similarly, the concurrent rate of change of the increasing DC-link voltage and the decreasing modulation index Mi may be adjusted during the adjustment period from t1 to t2.

Although referred to as an over-modulation mode 320 where the modulation index is normally set to values in the over-modulation range, the modulation index may also be set to vales in the linear modulation range, at least for a part of the duration of the over-modulation mode 320.

The over-modulation mode 320 may be ended by adjustment of the modulation index Mi to a lower modulation index Mi, e.g. back to a modulation index in the linear range, dependent on the DC-link voltage between the first and second voltage levels. For example, when the DC-link voltage reaches the second voltage level 303, this may trigger a change of the modulation index, e.g. as illustrated in FIG. 3A.

The duration of the over-modulation mode 320 may be dependent on the detected operational condition, e.g. the level of overvoltage of the grid voltage Ug or other value. For example, a particular detected condition, e.g. grid voltage Ug, may set a predetermined period of time of the over-modulation mode. Alternatively, a particular detected condition, e.g. grid voltage Ug, may set a minimum or maximum duration of the over-modulation mode so that the detected operational condition sets a variable period of time of the over-modulation mode with a possible minimum and/or maximum duration.

The duration of the first sub-periods 311, 321 of the DC-voltage adjustment and over-modulation modes 310, 320 may be significantly shorter than the second sub-periods 212, 322. For example, the first sub-periods 311, 321 may have a duration of 20 ms, whereas the subsequent second sub-periods 312, 322 may have a duration in the range from 0.1 seconds and up to 10 seconds or more. The wind turbine may be required to maintain a grid connection for much longer times, e.g. up to half an hour for over-voltage up to 116% or 125% of the nominal grid voltage. This can be achieved by extending the second sub-period 322 of the over-modulation mode 320 for the required period of time.

The concurrent decrease of the DC-link voltage UDC and increase of the modulation index Mi, i.e. the rate of change of these during their respective second sub-periods 312, 322, may be matched in order to achieve a desired output voltage of the grid side converter. For example, the rate of change of the increase of the modulation index Mi may be adapted dependent on the rate of change of the DC-link voltage UDC in order to generate a constant output voltage Uo.

It is noted that the decrease of the DC-link voltage UDC and the increase of the modulation index Mi may be shifted relative to each other, e.g. so that the initial decrease of the DC-link voltage is started before starting the increase of the modulation index Mi, i.e. before starting the second sub-period 322 of the over-modulation mode 320. Thus, in general at least a part of a period of decreasing the DC-link voltage and at least a part of a period of increasing the modulation index Mi takes place concurrently.

After the modulation index Mi has reached a value which generates the desired output voltage Uo at t4, the modulation index may be maintained at a constant value or possibly adjusted according to changes of the grid voltage Ug or the desired output voltage Uo_d, Uo_dH.

The DC-link voltage UDC and the modulation index Mi may be changed linearly during the first and/or second sub-periods 311, 312, 321, 322 or non-linearly including step-wise variations.

Since the DC-link voltage is ramped down, the period where the DC-link voltage is high, e.g. above 10% or 20-30% of the nominal voltage, the negative lifetime effect on the grid side converter is reduced compared to solutions where the DC-link voltage is maintained at a high level. Similarly, since the modulation index is ramped up, use of high over-modulation for longer periods only occurs when the operational condition persists for relative long periods, i.e. periods which are longer than the ramping period of the DC-link voltage.

Since the level of the DC-link voltage UDC and the period of time that the DC-link has a certain voltage has an impact on the remaining lifetime of the grid side converter 204, information about the estimated remaining life time may be used for determining how the wind turbine 100 should be operated.

Figure 3B:
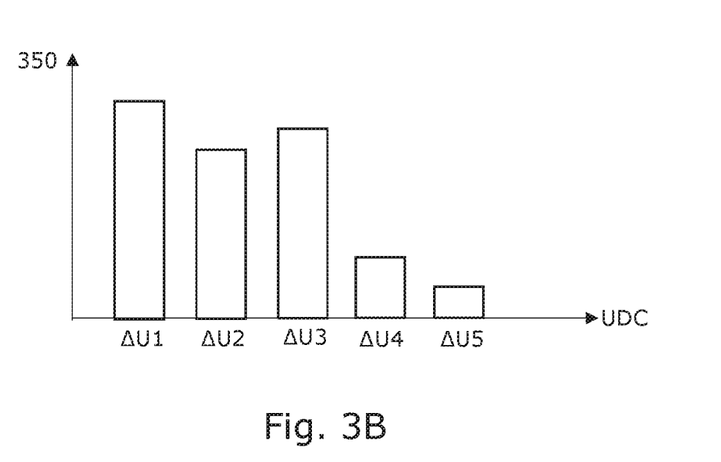
FIG. 3B shows accumulated DC-link voltage data obtained by summing the DC-link voltages over time.

The remaining life time may be determined based on accumulated DC-link voltage data which is obtained based on a DC-voltage and time data. For example, as illustrated in FIG. 3B, the accumulated DC-link voltage data 350 may be obtained summing or integrating the DC-link voltages over the period of time in which the DC-link voltage is within a given voltage range Δ1-Δ5. For example, a voltage range Δ1 may include DC-link voltages within a range from 5% to 10% above the nominal 0% level, or a range from 0% to 10% relative to the nominal voltage level of the DC-link voltage. The accumulated data binned into different ranges Δ1-Δ5 could be summed and used as a basis for determining the remaining lifetime with respect to cosmic rays. The accumulated DC-voltage data relates to an accumulated time where the DC-voltage is above a predetermined voltage level such as the 0% or 5% voltage level, or where the DC-voltage is within different ranges Δ1-Δ5.

For example, if there is a limited remaining lifetime of the grid side converter 204, it may be advantageous to limit the value of the second voltage level 303 to a lower voltage reserve or to limit the maximum duration where an increased DC-voltage may be applied, e.g. the duration of the first and/or second sub-periods 311, 312 of the DC-voltage adjustment mode 310. In general, the remaining lifetime or the accumulated DC-voltage data can be used for determining voltage levels of the DC-link and/or maximum durations of a given DC-link voltage.

Figure 4:
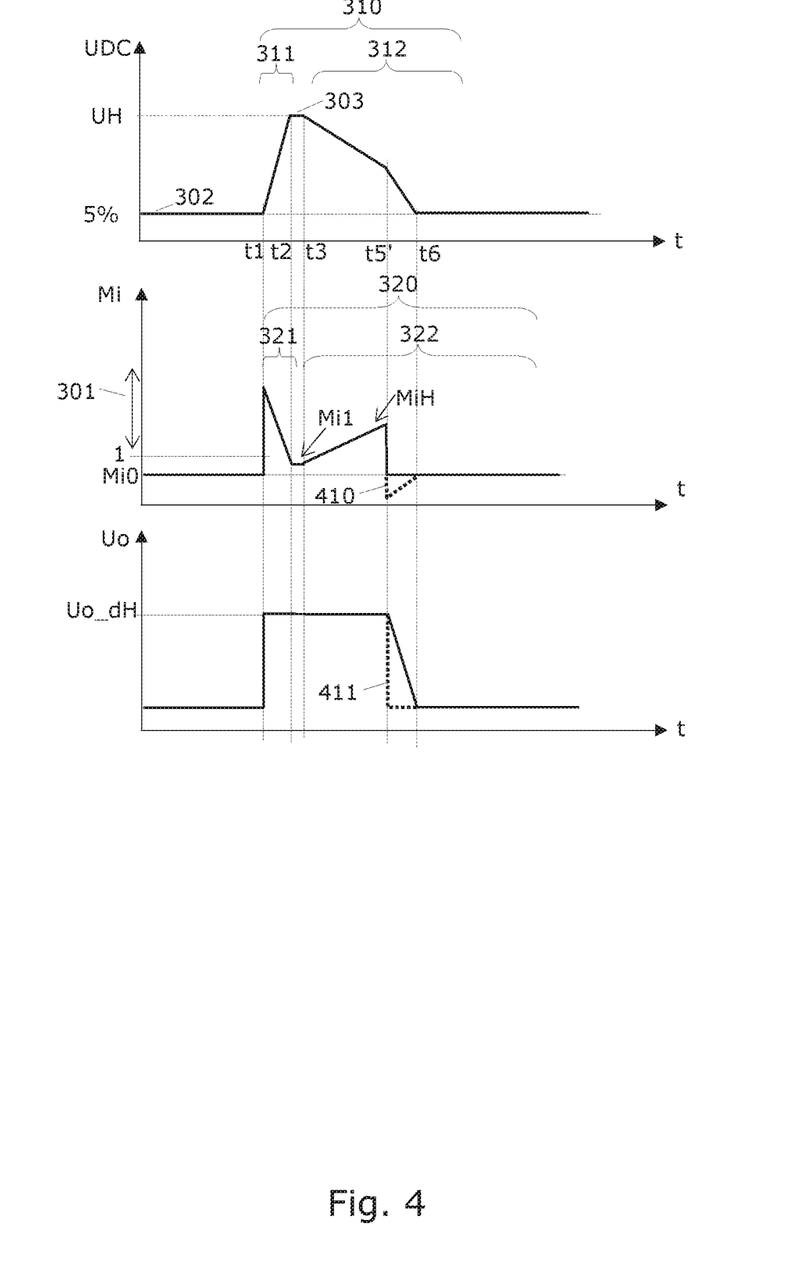
FIG. 4 shows the method for operating the wind turbine in a situation with an early cease of an over voltage situation.

FIG. 4 illustrates the method according to FIG. 3A, but where the cease of the operational condition is detected a t5', i.e. before the DC-link voltage has decreased to the first level 302. Even though the modulation index is reduced instantly or gradually (e.g. during t5' to t6) to the initial value Mi0, due to the capacity of the DC-link capacitor the discharging takes some time. Consequently, the output voltage Uo is reduced back to the nominal value over a corresponding period of time from t5' to t6.

A faster reduction of the output voltage Uo can be achieved by applying a fast reduction of the modulation index Mi at t5', e.g. by applying a step-reduction of the modulation index to a value which is lower than the nominal value of the modulation index Mi0. This is illustrated by dotted line 410 for the jump in the modulation index and dotted line 411 for the output voltage Uo generated in response to the modulating index jump 310 and the DC-link voltage reduction during t5'-t6.

Figure 5:
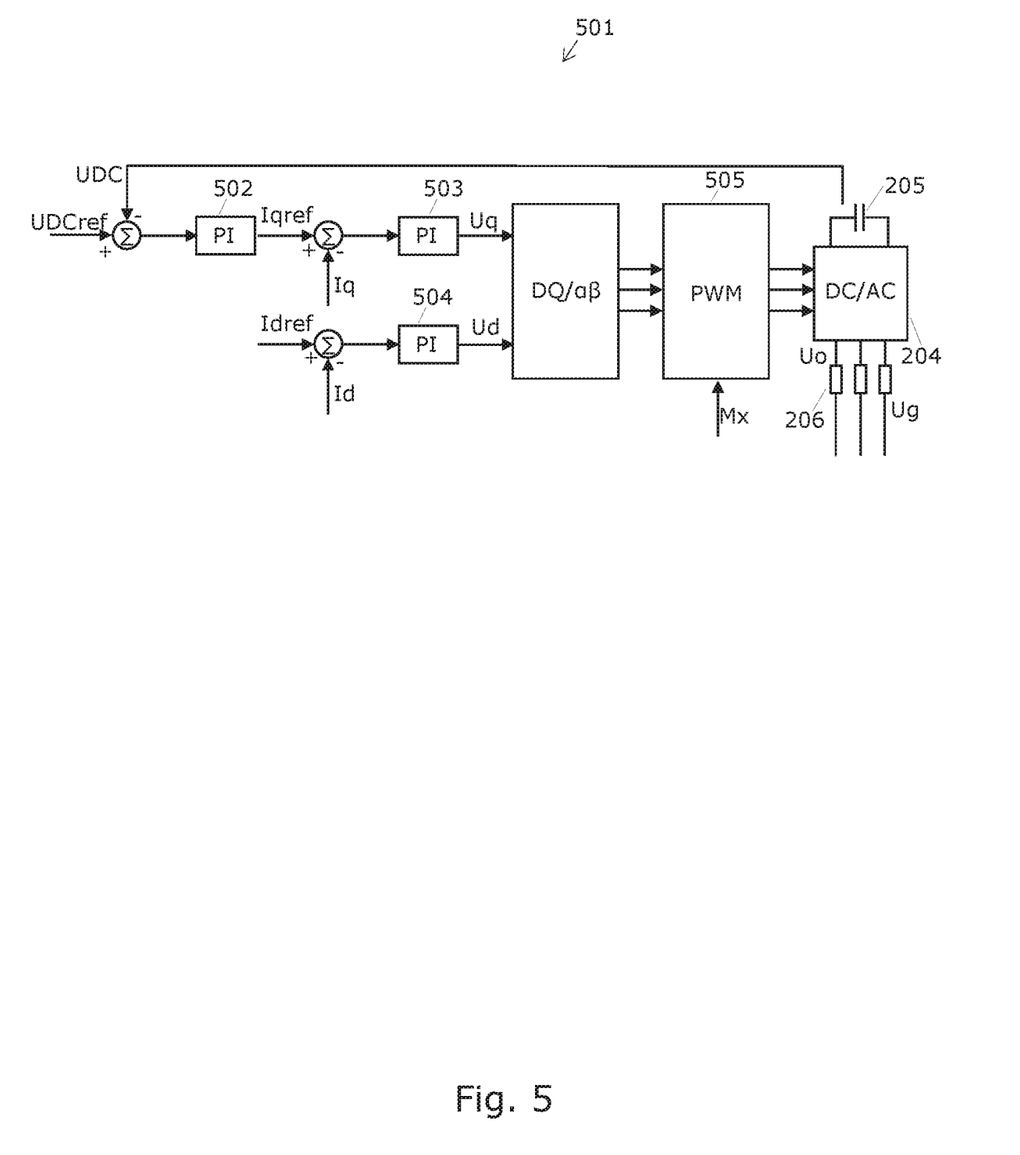
FIG. 5 shows a converter control system for controlling the reactive current Id and the active current Iq generated by the grid side converter.

FIG. 5 shows converter control system 501 for controlling the reactive current Id and the active current Iq generated by the grid side converter 204 and consequently the output voltage Uo. The converter control system 501, or components thereof, may form part of the control system 250. Alternatively, the converter control system 501 may receive control signals from the control system 250 such as a DC-link voltage reference UDCref and a modulation control signal Mx for the pulse width modulator 505.

The active current Iq is controlled via the voltage reference UDCref for the DC-link voltage UDC. The error between the UDCref and UDC is supplied to the controller 502 which may be PI or other suitable controller and which generates the active current reference Iqref. Iqref is compared with the actually produced active current Iq and the difference is supplied to the controller 503 which may be a PI or other suitable controller. The controller 503 determines a voltage control output Uq which is converted by the DQ/αβ unit from the DQ frame into the αβ frame. The output from the DQ/αβ unit is converted by the pulse-width-modulator PWM, 505 into a modulation signal for the grid side converter 204.

The reactive current Id is controlled is a similar way based on the reactive current reference Idref, which may be received from a power plant controller (PPC) or a grid operator (TSO).

The DC-link voltage reference UDCref is determined according to the desired DC-link voltages as explained above, e.g. the 5% level, the 10% level, the UH level, other levels and the up- and down ramping's of the desired DC-link voltage. Accordingly, an increased DC-link voltage reference UDCref leads to an increased Uq reference and thereby an increased output voltage Uo due to the increase of the DC-link voltage UDC.

The modulation index Mi of the modulator 505 can be controlled via the modulation input 506 by a modulation control signal Mx generated by the control system 250.

Although the present invention has been described in connection with the specified embodiments, it should not be construed as being in any way limited to the presented examples. The scope of the present invention is to be interpreted in the light of the accompanying claim set. In the context of the claims, the terms "comprising" or "comprises" do not exclude other possible elements or steps. Also, the mentioning of references such as "a" or "an" etc. should not be construed as excluding a plurality. The use of reference signs in the claims with respect to elements indicated in the figures shall also not be construed as limiting the scope of the invention. Furthermore, individual features mentioned in different claims, may possibly be advantageously combined, and the mentioning of these features in different claims does not exclude that a combination of features is not possible and advantageous.

The invention claimed is:

1. A method for operating a wind turbine comprising a power generator, a generator side converter, a grid side converter, and a DC link electrically connected to an output of the generator side converter and an input of the grid side converter, the method comprising:
   monitoring a wind turbine signal to detect an operational condition requiring an increase of an output voltage of the grid side converter; and
   responsive to detecting the operational condition:
      initiating an over-modulation mode, wherein during a first sub-period of the over-modulation mode, the grid side converter is operated with a modulation index being increased to a value in an over-modulation range, wherein the first sub-period follows a second sub-period of the over-modulation mode during which the grid side converter is operated with the modulation index in the over-modulation range; and
      initiating a DC voltage adjustment mode, wherein during a third sub-period of the DC voltage adjustment mode, a DC voltage of the DC link is decreased from a second voltage level towards a first voltage level, wherein the third sub-period follows a fourth sub-period of the DC voltage adjustment mode during which the DC voltage is increased from the first voltage level towards the second voltage level.

2. The method according to claim 1, wherein a rate of decreasing the DC voltage and a rate of increasing the modulation index are matched in order to achieve a desired value of the output voltage at least during the first sub-period or the third sub-period.

3. The method according to claim 1, wherein the first sub-period and the third sub-period are at least partly overlapping.

4. The method according to claim 1, wherein the first sub-period depends on a duration of the detected operational condition.

5. The method according to claim 1, further comprising: obtaining accumulated DC voltage data based on a level of the increased DC voltage and time data, where the accumulated DC voltage data relates to an accumulated time where the DC voltage is above a predetermined voltage level.

6. The method according to claim 5, further comprising: determining, based on the accumulated DC voltage data, one or more of: the second voltage level, a duration of the third sub-period, and a rate of decreasing the DC voltage.

7. The method according to claim 1, wherein the detected operational condition is an over-voltage situation where a grid voltage is above a nominal grid voltage level.

8. The method according to claim 1, wherein in the second sub-period the grid side converter is operated with the modulation index in the over-modulation range for a predetermined or variable period of time.

9. The method according to claim 8, wherein the second sub-period and the fourth sub-period are concurrent.

10. The method according to claim 8, further comprising: reducing the modulation index during the second sub-period from a value in the over-modulation range to a value in a linear modulation range depending on a level of the DC voltage.

11. The method according to claim 10, wherein the modulation index is reduced to the value in the linear modulation range in response to the DC voltage reaching the second voltage level.

12. The method according to claim 10, wherein a rate of decreasing the modulation index during the second sub-period and a rate of increasing the DC voltage during the fourth sub-period are matched in order to achieve a desired value of the output voltage.

13. The method according to claim 1, further comprising: changing the modulation index dependent on a level of the DC voltage between the first voltage level and the second voltage level.

14. A control system for operating a wind turbine, wherein the wind turbine comprises a power generator, a generator side converter, a grid side converter, and a DC link electrically connected to an output of the generator side converter and an input of the grid side converter; wherein the control system comprises:
one or more computer processors configured to:
monitor a wind turbine signal to detect an operational condition requiring an increase of an output voltage of the grid side converter; and
responsive to detecting the operational condition:
initiate an over-modulation mode, wherein during a first sub-period of the over-modulation mode, the grid side converter is operated with a modulation index being increased to a value in an over-modulation range, wherein the first sub-period follows a second sub-period of the over-modulation mode during which the grid side converter is operated with the modulation index in the over-modulation range; and
initiate a DC voltage adjustment mode, wherein during a third sub-period of the DC voltage adjustment mode, a DC voltage of the DC link is decreased from a second voltage level towards a first voltage level, wherein the third sub-period follows a fourth sub-period of the DC voltage adjustment mode during which the DC voltage is increased from the first voltage level towards the second voltage level.

15. A wind turbine, comprising:
a power generator;
a generator side converter;
a grid side converter;
a DC link electrically connected to an output of the generator side converter and an input of the grid side converter; and
a control system configured to:
monitor a wind turbine signal to detect an operational condition requiring an increase of an output voltage of the grid side converter;
responsive to detecting the operational condition:
initiate an over-modulation mode, wherein during at least a first sub-period of the over-modulation mode, the grid side converter is operated with a modulation index being increased to a value in an over-modulation range, wherein the first sub-period follows a second sub-period of the over-modulation mode during which the grid side converter is operated with the modulation index in the over-modulation range; and
initiate a DC voltage adjustment mode, wherein during at least a third sub-period of the DC voltage adjustment mode, a DC voltage of the DC link is decreased from a second voltage level towards a first voltage level, wherein the third sub-period follows a fourth sub-period of the DC voltage adjustment mode during which the DC voltage is increased from the first voltage level towards the second voltage level.

16. The control system according to claim 14, wherein the detected operational condition is an over-voltage situation where a grid voltage is above a nominal grid voltage level.

17. The control system according to claim 14, wherein the second sub-period and the fourth sub-period are concurrent.

18. The control system according to claim 14, wherein the one or more computer processors are further configured to:
reduce the modulation index during the second sub-period from a value in the over-modulation range to a value in a linear modulation range depending on a level of the DC voltage.

19. The wind turbine according to claim 15, wherein the second sub-period and the fourth sub-period are concurrent.

20. The wind turbine according to claim 15, wherein the control system is further configured to:
reduce the modulation index during the second sub-period from a value in the over-modulation range to a value in a linear modulation range depending on a level of the DC voltage.

* * * * *